(12) United States Patent
Negi

(10) Patent No.: US 8,008,389 B2
(45) Date of Patent: Aug. 30, 2011

(54) POLYAMIDE RESIN COMPOSITION

(75) Inventor: Yukinari Negi, Uji (JP)

(73) Assignee: Unitika Ltd., Amagasaki-shi, Hyogo (JP)

( * ) Notice: Subject to any disclaimer, the term of this patent is extended or adjusted under 35 U.S.C. 154(b) by 399 days.

(21) Appl. No.: 12/296,642

(22) PCT Filed: Apr. 24, 2007

(86) PCT No.: PCT/JP2007/058831
§ 371 (c)(1),
(2), (4) Date: Oct. 9, 2008

(87) PCT Pub. No.: WO2007/125907
PCT Pub. Date: Nov. 8, 2007

(65) Prior Publication Data
US 2009/0182086 A1    Jul. 16, 2009

(30) Foreign Application Priority Data
Apr. 28, 2006 (JP) .................................. 2006-125571

(51) Int. Cl.
C08K 3/34 (2006.01)
C08L 77/00 (2006.01)
(52) U.S. Cl. ......... 524/442; 524/445; 524/606; 525/423
(58) Field of Classification Search ............... 524/442, 524/445, 606; 525/423
See application file for complete search history.

(56) References Cited

FOREIGN PATENT DOCUMENTS

| CN | 1206028 A | 1/1999 |
|---|---|---|
| JP | 57-137762 A | 8/1982 |
| JP | 3-121120 A | 5/1991 |
| JP | 3-170545 A | 7/1991 |
| JP | 8-22946 B2 | 3/1996 |
| JP | 8-92465 A | 4/1996 |
| JP | 2941159 B2 | 6/1999 |
| JP | 2002-88150 A | 3/2002 |
| JP | 2002-338886 A | 11/2002 |
| JP | 2005-240973 A | 9/2005 |
| JP | 2006131832 A * | 5/2006 |

OTHER PUBLICATIONS

Machine translation of JP 2006-131832 A, May 25, 2006.*
Office Action mailed Jun. 2, 2010 for Chinese application No. 200780015370.0.

* cited by examiner

*Primary Examiner* — Vickey Nerangis
(74) *Attorney, Agent, or Firm* — Birch, Stewart, Kolasch & Birch, LLP

(57) ABSTRACT

Provided is a polyamide resin composition superior in mechanical properties such as strength and elastic modulus and also in toughness, durability, frictional abrasion resistance, and water absorption resistance, wherein the polyamide resin composition contains 0.1 to 4 parts by mass of an aliphatic epoxy compound (B) having three glycidyl groups in the molecule, formulated to 100 parts by mass of a polyamide resin (A) with silicate layers of swellable lamellar silicate dispersed therein. The epoxy equivalence of the aliphatic epoxy compound (B) is preferably 180 g/eq or less, and the aliphatic epoxy compound (B) preferably has trimethylolpropane and/or glycerol as a skeleton.

3 Claims, No Drawings

POLYAMIDE RESIN COMPOSITION

TECHNICAL FIELD

The present invention relates to a polyamide resin composition superior in mechanical properties such as strength and elastic modulus and also in toughness, durability, lubricity, and water absorption resistance.

BACKGROUND ART

Polyamide resins, which have superior physical and chemical properties, have been used as raw materials in a wide range of applications, for example in production of various molded products, films, fibers, and others. Particularly in recent wide-spread use of the resins as automobile parts, electric and electronic parts, mechanical parts, and construction materials, there is further increase and diversification of the requirements for the polyamide resins in properties. For example, for use as a gear in automobile electric power-steering systems, which are exposed to high load for an extended period of time, the resin is required to be improved not only in strength and rigidity, but also in toughness and durability. It is also demanded to be superior in lubricity for improvement in abrasion resistance and also in dimensional accuracy for keeping resistance of gear parts constant and also to have low specific density.

It is well known that a reinforcing material such as glass fiber or inorganic filler is blended into a polyamide resin for improvement in strength and rigidity, and such a method is used in various application fields (see e.g., Patent Document 1). However, for example, blending of a glass fiber into a polyamide resin composition leads to increase of its specific gravity, and such a resin is not used favorably as a part for use in applications demanding lubricity, because, when the resin is used for a gear part, the glass fiber therein causes abrasion of the counter metal gear during engagement.

On the other hand, polyamide resin compositions obtained by dispersing swellable lamellar silicate such as synthetic fluorinated mica or montmorillonite in a polyamide resin are attracting attention recently. These resin compositions are known to be superior in strength, rigidity, heat resistance etc., and, for example, a resin composition containing nylon 6 and a synthetic fluorinated mica (see Patent Document 2) and a resin composition containing nylon 6 and montmorillonite (see Patent Document 3) are known. However, there was a need for further improvement in performance, specifically in toughness and durability, of these resin compositions.

In addition, monomer cast nylons (MC nylons) have been known as polyamide resins superior in strength, impact resistance and durability that are produced without use of a reinforcing material such as glass fiber (see Patent Documents 4 and 5). However, the MC nylons are materials unsuitable for injection molding and thus, need in practice machining processing of the block for forming a desired shape, causing a problem in production cost.

Patent Document 1: Japanese Patent application Laid-Open No. Sho 57-137762
Patent Document 2: Japanese Patent Publication No. 2941159
Patent Document 3: Japanese Examined Patent Publication No. 8-22946
Patent Document 4: Japanese Patent application Laid-Open No. 2002-88150
Patent Document 5: Japanese Patent application Laid-Open No. 2005-240973

DISCLOSURE OF THE INVENTION

Technical Problems to be Solved

An object of the present invention is to provide a polyamide resin composition superior in mechanical properties such as strength and elastic modulus and also in toughness, durability, frictional abrasion resistance, and water absorption resistance.

Means to Solve the Problems

After intensive studies, the inventors have found that it was possible to solve the problems above by blending a particular aliphatic epoxy compound into a polyamide resin containing swellable lamellar silicate dispersed therein, and made the present invention. Therefore, the present invention provides a polyamide resin composition, comprising 0.1 to 4 parts by mass of an aliphatic epoxy compound having three glycidyl groups in the molecule, formulated to 100 parts by mass of a polyamide resin containing silicate layers of swellable lamellar silicate dispersed therein.

Advantageous Effects of the Invention

The present invention can provide a polyamide resin composition superior in mechanical properties such as strength and elastic modulus and also in toughness, durability, lubricity, water absorption resistance and dimensional accuracy.

BEST MODES FOR CARRYING OUT THE INVENTION

Hereinafter, the present invention will be described in detail.

The polyamide resin (A) according to the present invention is the one with silicate layers of swellable lamellar silicate dispersed in a polyamide resin matrix.

The silicate layer is a basic unit forming swellable lamellar silicate, and a plate-shaped inorganic crystal obtained by destroying (hereinafter, referred to as "cleavage") the layer structure of the swellable lamellar silicate.

The silicate layers are preferably dispersed uniformly in polyamide resin on molecular order level. The term "uniformly dispersed on molecular order level" means that, during dispersion of the silicate layers of the swellable lamellar silicate in the polyamide resin, respective laminar fragments have an average interlayer distance of 1 nm or more and are present uniform without formation of lumps. The lump means a state when the raw swellable lamellar silicate is not cleaved. In addition, the interlayer distance is a distance between layers in silicate layers. The dispersion state of silicate layers in polyamide resin is verified, for example, by observation under a transmission electron microscope.

The silicate layers may not be cleaved in such a manner that each layer therein is completely separated, and thus, the silicate layers may be partially layered.

The swellable lamellar silicate for use in the present invention has a structure composed of negatively charged crystal layers containing silicate as a principal component and cations capable of ion exchange that are present between the layers, and preferably has a cation exchange capacity, as determined by the method below, of 50 or more milliequivalence/100 g. The silicate having a cation exchange capacity of 50 or less milliequivalence/100 g is lower in swelling potential and thus, remains substantially in the uncleaved state during production of the polyamide composite material, leading to insufficient improvement in properties of the polyamide composite material. The upper limit of cation-exchange capacity is not particularly limited, but the upper limit of cation exchange capacity of practically available and producible swellable lamellar silicate is approximately 250 milliequivalence/100 g.

The swellable lamellar silicate for use in the present invention may be natural product or an artificially produced or modified product, and examples thereof include smectites (montmorillonite, beidelite, hectolite, sauuconite, etc.), vermiculites (vermiculite, etc.), micas (fluorinated mica, muscorite, paragonite, phlogopite, lepidolite, etc.), brittle micas (margarite, clintonite, anandite, etc.), chlorites (donbassite, sudoite, cookeite, clinochlore, chamosite, nimite, etc.) and the like; and, in the present invention, the Na or Li type of swellable fluorinated mica or montmorillonite is used particularly favorably.

The swellable fluorinated mica favorably used in the present invention has a composition shown by the following general formula.

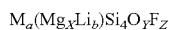

$$M_a(Mg_xLi_b)Si_4O_YF_Z$$

(wherein, M represents an ion-exchanging cation, specifically sodium or lithium; a, b, X, Y and Z respectively represent a coefficient, and $0 \leq a \leq 0.5$, $0 \leq b \leq 0.5$, $2.5 \leq x \leq 3$, $10 \leq Y \leq 11$, and $1.0 \leq Z \leq 2.0$).

Such swellable fluorinated micas favorably used are available as commercial products from CO-OP Chemical Co., Ltd. and Topy Industries Ltd. and can also be produced easily by the following production methods.

A so-called melting method of mixing silicon oxide, magnesium oxide and various fluorides, melting the mixture completely in an electric furnace or a gas oven at a temperature of 1,400 to 1,500° C., and growing crystals of the fluorinated mica in the reaction container in the cooling process; and a method of obtaining a fluorinated mica by intercalating a starting material talc with an alkali metal ion. The latter method gives a fluorinated mica, by mixing talc with an alkali silicofluoride or an alkali fluoride and heat-treating the mixture in a ceramic crucible at 700 to 1,200° C. for a short period of time.

The montmorillonite for use in the present invention is the compound represented by the following Formula, which is produced from a natural product after purification, for example, by elutriation.

$$M_aSi(Al_{2-a}Mg)O_{10}(OH)_2 \cdot nH_2O$$

(wherein, M represents a cation such as sodium; $0.25 \leq a \leq 0.6$; and the number of water molecules bound to the interlayer ion-exchangeable cations, which is expressed by $nH_2O$, may vary significantly according to the cationic species used and the conditions such as humidity).

The montmorillonites include the one substituted with similar ions, such as magnesian montmorillonite, iron montmorillonite, and iron magnesian montmorillonite, and such a montmorillonite may be used instead.

The initial particle size of the swellable lamellar silicate for use in the present invention is not particularly limited, but is selected properly, tanking into consideration the influence of rigidity and heat resistance of a polyamide resin composition obtained. The particle size is preferably in the range of about 0.1 to 20 μm. The initial particle size may be controlled as needed by pulverization, for example, by using a jet mill. The initial particle size is a particle size of swellable lamellar silicate used as a raw material in production of the polyamide resin (A) for use in the present invention, and is different from the size of silicate layers in the composite material.

In producing swellable lamellar silicate by the intercalation method, it is possible to change the initial particle size thereof by selecting the particle size of the raw material talc properly. The intercalation method is favorable in that it is possible to control the initial particle size in a wider range, in combination with pulverization.

The polyamide according to the present invention is a polymer having amide bonds in the main chain that is produced mainly from raw materials of an aminocarboxylic acid, lactam, or a diamine and a dicarboxylic acid (including a pair of the salts). Typical examples of the raw materials include aminocarboxylic acids such as 6-aminocaproic acid, 11-aminoundecanoic acid, 12-aminododecanoic acid, and para-aminomethylbenzoic acid; lactams such as ε-caprolactam, ω-undecanolactam, ω-laurolactam; diamines such as tetramethylenediamine, hexamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, meta-xylylenediamine, para-xylylenediamine, 1,3-bis(aminomethyl)cyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine; and dicarboxylic acids such as adipic acid, suberic acid, azelaic acid, sebacic acid, dodecanedicarboxylic acid, terephthalic acid, isophthalic acid, 2-chloroterephthalic acid, 2-methylterephthalic acid, 5-methylisophthalic acid, sodium 5-sulfoisophthalic acid, hexahydroterephthalic acid, hexahydroisophthalic acid. These diamines and dicarboxylic acids may be used as a pair of salts.

Favorable examples of the polyamide resins according to the present invention for use include polycaproamide (nylon 6), polytetramethylene adipamide (nylon 46), polyhexamethylene adipamide (nylon 66), polycaproamide/polyhexamethylene adipamide copolymer (nylon 6/66), polyundecamide (nylon 11), polycaproamide/polyundecamide copolymer (nylon 6/11), polydodecamide (nylon 12), polycaproamide/polydodecamide copolymer (nylon 6/12), polyhexamethylene sebacamide (nylon 610), polyhexamethylene dodecamide (nylon 612), polyundecamethylene adipamide (nylon 116), polyhexamethylene isophthalamide (nylon 6I), polyhexamethylene terephthalamide (nylon 6T), polyhexamethylene terephthalamide/polyhexamethylene isophthalamide copolymer (nylon 6T/6I), polycaproamide/polyhexamethylene terephthalamide copolymer (nylon 6/6T), polycaproamide/polyhexamethylene isophthalamide copolymer (nylon 6/6I), polyhexamethylene adipamide/polyhexamethylene terephthalamide copolymer (nylon 66/6T), polyhexamethylene adipamide/polyhexamethylene isophthalamide copolymer (nylon 66/6I), polytrimethylhexamethylene terephthalamide (nylon TMDT), polybis(4-aminocyclohexyl)methane dodecamide (nylon PACM12), polybis(3-methyl-4-aminocyclohexyl)methane dodecamide (nylon dimethyl PACM12), polymeta-xylylene terephthalamide (nylon MXD6), polyundecamethylene terephthalamide (nylon 11T) and the mixtures thereof. Among them, nylon 6, nylon 66, nylon 11, nylon 12 and the mixture thereof are particularly preferable.

The relative viscosity of the polyamide resin (A) according to the present invention, as determined under the conditions of temperature of 25° C. and concentration of 1 q/dl in 96 mass % conc. sulfuric acid as solvent, is preferably 2.0 to 4.5, most preferably 2.3 to 4.0 in the case of nylon 6 or 66 and preferably 1.2 to 2.8, most preferably 1.4 to 2.3 in the case of nylon 11 or 12. Unfavorably when the relative viscosity is lower than the lower limit, the polyamide resin composition obtained in the present invention may be lower in durability and toughness. On the other hand, unfavorably when the relative viscosity is larger than the upper limit, the fluidity of the polyamide resin composition when melted may decline extremely, leading to drastic deterioration in moldability.

Examples of the aliphatic epoxy compounds (B) having three glycidyl groups in the molecule according to the present invention include trimethylolpropane polyglycidyl ether, glycerol polyglycidyl ether, diglycerol polyglycidyl ether, and polyglycerol polyglycidyl ether. In particular, those having trimethylolpropane and/or glycerol as a skeleton such as trimethylolpropane polyglycidyl ether and glycerol polyglycidyl ether are used favorably.

The structural formula of trimethylolpropane polyglycidyl ether is shown below.

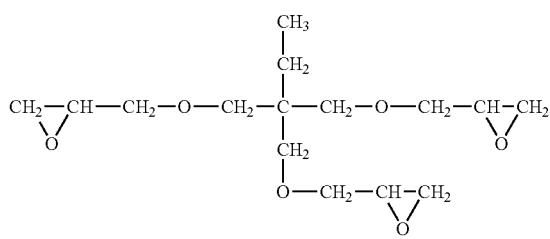

[Formula 1]

The structural formula of glycerol polyglycidyl ether is as follows,

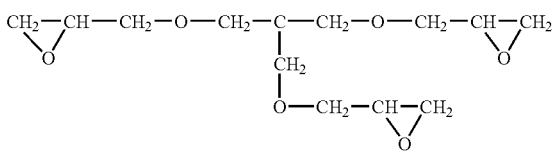

[Formula 2]

In the present invention, the number of the glycidyl groups in the molecule of the aliphatic epoxy compound (B) should be three. If the number thereof is 2 or less, improvement of strength, toughness, and durability is poor and advantageous effects of the present invention can not be obtained. On the other hand, if the number thereof is 4 or more, drastic gelation of the polyamide resin occurs, resulting in deterioration in productivity.

The epoxy equivalence of the aliphatic epoxy compound (B) is preferably 180 g/eq or less, more preferably 150 g/eq or less. The epoxy equivalence of more than 180 g/eq unfavorably leads to decrease in improvement in particular of strength, toughness, and durability. In addition, the viscosity of the aliphatic epoxy compound (B) at 25° C. is preferably 1 to 1500 mPa·s, more preferably 1 to 1000 mPa·s, from the viewpoint of productivity.

A blending amount of the component (B) is in the range of 0.05 to 4.0 parts by mass, preferably 0.1 to 3.0 parts by mass, and more preferably 0.2 to 3.0 parts by mass, with respect to 100 parts by mass of the polyamide resin (A). The component (B) blending amount of less than 0.05 part by mass unfavorably leads to insufficient improvement of rigidity, toughness, durability, and lubricity of the polyamide resin composition. On the other hand, the blending amount of more than 4.0 parts by mass unfavorably leads to drastic deterioration of fluidity and molding processability of the polyamide resin composition and also to gelation in the solvent for relative viscosity measurement (conc. sulfuric acid), thus, lowering physical properties of the final product. In addition to the aliphatic epoxy compound (B), an aliphatic epoxy compound having 2 or less or 4 or more glycidyl groups in the molecule may be used, so far as advantageous effects of the present invention are not impaired.

The method of producing the polyamide resin composition according to the present invention is not particularly limited, but normally, a polyamide resin (A) and an aliphatic epoxy compound (B) are melt and kneaded and then extruded by a biaxial extruder into strands, which are then pelletized.

Hereinafter, the method of producing the polyamide resin (A) according to the present invention will be described.

The polyamide resin (A) is prepared generally by feeding a specific amount of monomers into autoclave in the presence of swellable lamellar silicate properly selected, allowing melt polycondensation by use of an initiator such as water under the conditions of a temperature in the range of 200 to 300° C. and a pressure of 0.2 to 3 MPa for 1 to 15 hours. When nylon 6 is used as a matrix resin, the polymerization is preferably carried out under the conditions of a temperature in the range of 250 to 280° C. and a pressure of 0.5 to 2 MPa for 3 to 5 hours.

The pellets of the polyamide resin composition are preferably purified by hot water washing for removal of the monomer remaining in the polyamide resin composition after polymerization. In this case, the processing is carried out preferably in hot water at 90 to 100° C. for 8 hours or more.

Alternatively, the polyamide resin (A) may be produced by melting and kneading swellable lamellar silicate previously treated with a swelling agent and a polyamide resin. The swelling agent is preferably an organic cation, such as organic ammonium or phosphonium ion. The organic ammonium ion is, for example, a primary to quaternary ammonium ion. Examples of the primary ammonium ions include octylammonium, dodecylammonium, octadecylammonium and the like. Examples of the secondary ammonium ions include dioctylammonium, methyloctadecylammonium, dioctadecylammonium and the like. Examples of the tertiary ammonium ions include trioctylammonium, dimethyldodecylammonium, didodecylmonomethylammonium and the like. Examples of the quaternary ammonium ions include tetraethylammonium, trioctylmethylammonium, octadecyltrimethylammonium, dioctadecyldimethylammonium, dodecyldihexylmethylammonium, dihydroxyethylmethyloctadecylammonium, methyldodecylbis(polyethylene glycol)ammonium, methyldiethyl(polypropylene glycol)ammonium and the like. Examples of the organic phosphonium ions include tetraethylphosphonium, tetrabutylphosphonium, tetrakis(hydroxymethyl)phosphonium, 2-hydroxyethyltriphenylphosphonium and the like. These compounds may be used alone or in combination of two or more. Among the compounds above, an ammonium ion is used favorably.

How to treat lamellar silicate with the organic cation is exemplified by first dispersing the lamellar silicate in water or alcohol, adding the organic cation thereto as a salt, and mixing and stirring the mixture to allow ion-exchange of inorganic ions in the lamellar silicate with an organic cation, followed by, filtering, washing and drying.

A content of silicate layers of swellable lamellar silicate is preferably 0.1 to 20 mass %, more preferably 1.0 to 10 mass %, with respect to 100 mass % of the polyamide resin (A) including the silicate layers. The amount can be determined from inorganic ash rate of polyamide resin (A) described below. The blending rate of less than 0.5 mass % results in poor reinforcement effect on the polyamide resin matrix by silicate layers of swellable lamellar silicate. On the other hand, the blending rate of more than 20 mass % unfavorably leads to deterioration in toughness.

In production of the polyamide resin composition according to the present invention, additives such as heat stabilizer, antioxidant, pigment, anti-coloring agent, antiweathering agent, flame retardant, lubricity improver, plasticizer, crystal-nucleating agent, and mold-releasing agent may be added thereto, so far as the favorable properties of the composition are not impaired significantly. These additives may be added at any stage in production of the polyamide resin composition, for example, during polymerization of the polyamide resin (A) or during melting and kneading of the composition with the aliphatic epoxy compound (B).

Examples of the heat stabilizers and antioxidants include hindered phenols, phosphorus compounds, hindered amines, sulfur compounds, copper compounds, alkali metal halides, and the mixtures thereof.

The polyamide resin composition according to the present invention may be mixed with other thermoplastic resins.

Examples of the thermoplastic resins include elastomers such as polybutadiene, butadiene/styrene copolymer, acrylic rubber, ethylene/propylene copolymer, ethylene/propylene/diene copolymer, natural rubber, chlorinated butyl rubber, and chlorinated polyethylene, or the one thereof modified with maleic anhydride; polyethylene, polypropylene, butadiene/acrylonitrile copolymer, polyvinyl chloride, polyethylene terephthalate, polyacetal, polyvinylidene fluoride, polysulfone, polyphenylene sulfide, polyether sulfone, phenoxy resin, polyphenylene ether, polymethyl methacrylate, polyether ketone, polycarbonate, polytetrafluoroethylene, polyarylate, and the like.

EXAMPLES

Hereinafter, the present invention will be described more specifically with reference to Examples.

The raw materials used in Examples and the test methods of physical properties are as follows.

1. Raw Materials (1) Polyamide Resin (A-1)

One kg of water and 200 g of a swellable fluorinated mica (ME-100, manufactured by CO-OP Chemical Co., Ltd., cation exchange capacity: 100 milliequivalence/100 g, particle size: 4 μm) were added to 10 kg of ε-caprolactam; and the mixture was placed in an autoclave having a capacity of 30 liter and heated to 260° C. and pressurized to an internal pressure of 1.5 MPa. The mixture was allowed to polymerize for two hours while the pressure and the temperature were held constant respectively at 1.5 MPa and 260° C. with gradual discharge of steam, and then, the autoclave was depressurized gradually over one hour, allowing the mixture to polymerize additionally for 30 minutes. After completion of polymerization, the reaction product was extruded into strand, which was cooled, solidified, and cut into pellets of the polyamide resin. Subsequently, the pellets were washed with hot water at 95° C. for 8 hours and then dried under vacuum. Inorganic ash rate measurement showed that the polyamide resin obtained had a silicate layer content of 2.2 mass %, and the relative viscosity thereof, as determined by the viscosity measurement method described below, was 2.7. Wide-angle X-ray diffraction measurement of the polyamide resin pellet showed that the peaks of the fluorinated mica in the thickness direction disappeared completely, indicating that the fluorinated mica was dispersed in the polyamide resin uniformly on molecular order level.

(2) Polyamide Resin (A-2)

One kg of water and 400 g of montmorillonite (Kunipia F, manufactured by Kunimine Industries Co., Ltd, cation exchange capacity: 115 milliequivalence/100 g, particle size: 1 μm) were added to 10 kg of ε-caprolactam; and the mixture was placed in an autoclave having a capacity of 30 liter and heated to 260° C. and pressurized to an internal pressure of 1.5 MPa. The mixture was allowed to polymerize for two hours while the pressure and the temperature were held constant respectively at 1.5 MPa and 260° C. with gradual discharge of steam, and then the autoclave was depressurized gradually over one hour, allowing the mixture to polymerize additionally for 15 minutes. After completion of polymerization, the reaction product was extruded into strand, which was cooled, solidified, and cut into pellets of the polyamide resin. Subsequently, the pellets were washed with hot water at 95° C. for 8 hours and then dried under vacuum. The polyamide resin obtained had a silicate layer content of 4.0 mass %, and the relative viscosity thereof, as determined by the viscosity measurement method described below, was 2.5. Wide-angle X-ray diffraction measurement of the polyamide resin pellet showed that the peaks of the montmorillonite in the thickness direction disappeared completely, indicating that the montmorillonite was dispersed in the polyamide resin uniformly on molecular order level.

(3) Polyamide Resin (A-3)

95 mass % of a polyamide resin P-2 described below and 5 mass % of swellable lamellar silicate swelling-treated with dodecyl dihexylmethylammonium (MEE (dodecyldihexylmethylammonium-treated ME-100), manufactured by CO-OP Chemical Co., Ltd., organic component: 30 mass %, particle size 8 μm) were supplied into the main inlet of a parallel twin-screw extruder (TEM37BS, manufactured by Toshiba Machine., Co. Ltd), and the resin composition was melted and kneaded, and extruded through the dice into strands, which were cooled and solidified in water bath and cut into pellets by a pelletizer. As for the extrusion conditions, the preset temperature was 250 to 260° C.; the screw rotation number, 200 rpm; and the discharge rate, 15 kg/h. The silicate layer content was 3.5 mass %, while the relative viscosity thereof, as determined by the viscosity measurement method described below, was 2.5. Wide-angle X-ray diffraction measurement of the polyamide resin pellet showed that the peaks of the montmorillonite in the thickness direction disappeared completely, indicating that the montmorillonite was dispersed in the polyamide resin uniformly on molecular order level.

(4) Polyamide Resin (A-4)

94 mass % of a polyamide resin P-3 described below and 6 mass % of swellable lamellar silicate swelling-treated with dodecyl dihexylmethylammonium (MEE (dodecyldihexylmethylammonium-treated ME-100), manufactured by CO-OP Chemical Co., Ltd., organic component: 30 mass %, particle size 8 μm) were supplied into the main inlet of a parallel twin-screw extruder (TEM37BS, manufactured by Toshiba Machine., Co. Ltd), and the resin composition was melted and kneaded, and extruded through the dice into strands, which were cooled and solidified in water bath, and cut into pellets by a pelletizer. As for the extrusion condition, the preset temperature was 270 to 290° C.; the screw rotation number, 200 rpm; and the discharge rate 15 kg/h. The silicate layer content was 4.2 mass %, and the relative viscosity thereof, as determined by the viscosity measurement method described below, was 2.8. Wide-angle X-ray diffraction measurement of the polyamide resin pellet showed that the peaks of the montmorillonite in the thickness direction disappeared completely, indicating that the montmorillonite was dispersed in the polyamide resin uniformly on molecular order level.

(5) Polyamide Resin (A-5)

Two kg of water and 400 g of a swellable fluorinated mica (ME-100, manufactured by CO-OP Chemical Co., Ltd., cation exchange capacity: 100 milliequivalence/100 g, particle size: 4 μm) were added to 10 kg of 12-aminododecanoic acid, and the mixture was placed in an autoclave having a capacity of 30 liter and heated to 230° C. and pressurized to an internal pressure of 1.5 MPa. The mixture was allowed to polymerize for two hours while the pressure and the temperature were held constant respectively at 1.5 MPa and 230° C. with gradual discharge of steam, and then the autoclave was depressurized gradually over one hour, allowed the mixture to polymerize additionally for 30 minutes. After completion of polymerization, the reaction product was extruded into strands, which were cooled, solidified, and cut into pellets of the polyamide resin. Inorganic ash rate measurement showed that the polyamide resin obtained had a silicate layer content of 4.2 mass %, and the relative viscosity thereof, as determined by the viscosity measurement method described below, was 1.6. Wide-angle X-ray diffraction measurement of the polyamide resin pellet showed that the peaks of the fluorinated mica in the thickness direction disappeared completely, indicating that the fluorinated mica was dispersed in the polyamide resin uniformly on molecular order level.

(6) Polyamide Resin (A-6)

94 mass % of the polyamide resin P-4 described below and 6 mass % of swellable lamellar silicate swelling-treated with dodecyl dihexylmethylammonium (MEE (dodecyldihexylmethylammonium-treated ME-100), manufactured by CO-OP Chemical Co., Ltd., organic component: 30 mass %, particle size 8 μm) were fed into the main inlet of a parallel twin-screw extruder (TEM37BS, manufactured by Toshiba Machine, Co. Ltd), and the resin composition was melted and kneaded, and extruded through a dice into strands, which was cooled and solidified in a water bath, and cut into pieces by a pelletizer, to give the pellets of the resin composition. As for the extrusion condition, the preset temperature was 270 to 290° C.; the screw rotation number, 200 rpm; and the discharge rate, 15 kg/h. The silicate layer content was 4.2 mass %, and the relative viscosity thereof, as determined by the viscosity measurement method described below, was 1.6. Wide-angle X-ray diffraction measurement of the polyamide resin pellet showed that the peaks of the montmorillonite in the thickness direction disappeared completely, indicating that the montmorillonite was dispersed in the polyamide resin uniformly on molecular order level.

(7) Polyamide Resin (A-7)

94 mass % of a polyamide 11 "BMNO" manufactured by Arkema and 6 mass % of swellable lamellar silicate swelling-treated with dodecyl dihexylmethylammonium (MEE (dodecyldihexylmethylammonium-treated ME-100), manufactured by CO-OP Chemical Co., Ltd., organic component: 30 mass %, particle size 8 μm) were supplied into the main inlet of a parallel twin-screw extruder (TEM37BS, manufactured by Toshiba Machine, Co. Ltd) and melted and kneaded, and extruded through a dice into strands, which was cooled and solidified in water bath and cut by a pelletizer, to give the pellets of the resin composition. As for the extrusion condition, the preset temperature was 230 to 250° C.; the screw rotation number, 200 rpm; and the discharge rate, 15 kg/h. The silicate layer content was 4.2 mass %, and the relative viscosity thereof, as determined by the viscosity measurement method described below, was 1.8. Wide-angle X-ray diffraction measurement of the polyamide resin pellet showed that the peaks of the swellable lamellar silicate in the thickness direction disappeared completely, indicating that the silicate of the swellable lamellar silicate was dispersed in the polyamide resin uniformly on molecular order level.

(8) Polyamide Resin (P-1)

A nylon 6 "A1030BRL" manufactured by UNITIKA, LTD was used. The relative viscosity thereof, as determined by the viscosity measurement method described below, was 3.4.

(9) Polyamide Resin (P-2)

A nylon 6 "A1030BRL" manufactured by UNITIKA, LTD was used. The relative viscosity thereof, as determined by the viscosity measurement method described below, was 2.5.

(10) Polyamide Resin Nylon 66 (P-3)

"A125" manufactured by UNITIKA, LTD was used. The relative viscosity thereof, as determined by the viscosity measurement method described below, was 2.8.

(11) Polyamide Resin Nylon 12 (P-4)

Two kg of water was added to 10 kg of 12-aminododecanoic acid, and the mixture was placed in an autoclave having a capacity of 30 liter and heated to 230° C. and pressurized to an internal pressure of 1.5 MPa. The mixture was allowed to polymerize for two hours while the pressure and the temperature were held constant respectively at 1.5 MPa and 230° C. with gradual discharge of steam, and then the autoclave was depressurized gradually over one hour, allowed the mixture to polymerize additionally for 30 minutes. After completion of polymerization, the reaction product was extruded into strands, which were cooled, solidified, and cut into pellets of the polyamide resin. The relative viscosity of the polyamide resin obtained, as determined by the viscosity measurement method described below, was 1.6.

(12) Epoxy Compound (B-1): "Trimethylolpropane polyglycidyl ether SR-TMP", manufactured by Sakamoto Yakuhin Kogyo Co., Ltd, having an epoxy equivalence of 137 g/eq, a viscosity of 125 mPa-s, that has three glycidyl groups in the molecule.

(B-2): "Glycerol polyglycidyl ether EX-313" manufactured by Nagase Chemtex Corporation, having an epoxy equivalence of 141 g/eq and a viscosity of 150 mPa-s that has three glycidyl groups in the molecule.

(B-3): "Diethylene glycol glycidyl ether SR-2EG" manufactured by Sakamoto Yakuhin Kogyo Co., Ltd, having an epoxy equivalence of 149 g/eq and a viscosity of 22 mPa-s that has two glycidyl groups in the molecule, represented by the following structural formula:

[Formula 3]

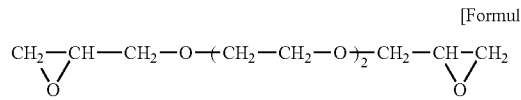

(B-4): "Trisepoxypropyl isocyanurate TEPIC-S" manufactured by Nissan Chemical Industries, Ltd that has three glycidyl groups in the molecule, represented by the following structural formula:

[Formula 4]

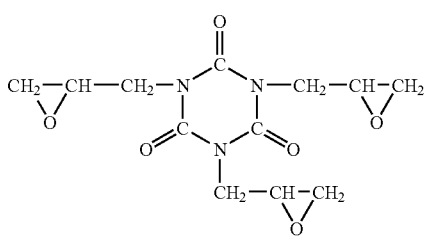

(B-5): "Sorbitol polyglycidyl ether EX-614B" manufactured by Nagase Chemtex Corporation, having an epoxy equivalence 173 q/eq and a viscosity 5000 mPa·s, that has four glycidyl groups in the molecule:

[Formula 5]

$$CH_2\!-\!CH\!-\!CH_2\!-\!O\!-\!CH_2\!-\!CH\!-\!CH\!-\!CH\!-\!CH\!-\!CH_2\!-\!O\!-\!CH_2\!-\!CH\!-\!CH_2$$

with pendant groups $CH_2\!-\!CH\!-\!CH_2$ (epoxide) at the OH-bearing backbone and $CH_2\!-\!CH\!-\!CH_2$ (epoxide) branches.

2. Measuring Methods (1) Cation Exchange Capacity (CEC) of Swellable Fluorinated Mica The cation exchange capacity was determined according to the method of measuring CEC of bentonite (powder) in the standard tests of the Japan bentonite Manufacturers Association (JBAS-106-77).

Specifically in an apparatus having a leachate container, a leaching tube and a receiver connected to each other in that order in the vertical direction, all interlayer cations in the swellable fluorinated mica are first replaced with $NH_4^+$ ions, while the mica was brought into contact with 1N aqueous ammonium acetate solution adjusted to pH 7. After washing thoroughly with water and ethyl alcohol, the $NH_4^+$-type swellable fluorinated mica was immersed in 10 mass % aqueous potassium chloride solution, allowing replacement of the $NH_4^+$ ions with $K^+$ ions. The CEC (milliequivalence/100 g) of the swellable fluorinated mica is determined by titrating the leachate containing the $NH_4^+$ ions released by the ion exchange reaction, with 0.1N aqueous sodium hydroxide solution.

The swellable fluorinated mica according to the present invention, in which all ion exchangeable cations are sodium ions, has a cation exchange capacity equivalent to 1 milliequivalence/100 g, i.e., 1 millimole/100 g.

(2) Relative Viscosity of Polyamide Resin

Dry pellets of a polyamide resin composition were dissolved in 96 mass % conc. sulfuric acid to a polyamide resin component concentration of 1 g/dl, taking its inorganic ash rate into consideration, and the solution was filtered through a G-3 glass filter for removal of inorganic components before measurement. The viscosity was determined by using a Ubbelohde viscometer at 25° C.

(3) Inorganic Ash Rate of Polyamide Resin Composition

Dry pellets of a polyamide resin composition were weighed accurately into a magnetic crucible and incinerated in an electric furnace held at 500° C. for 15 hours, and inorganic ash rate was calculated from the residual inorganic ash, according to the following Formula:

Inorganic ash rate (mass %)=(Inorganic ash mass (g)/ {Total sample mass before incineration (g)}×100

(4) Tensile Strength

The tensile strength was determined according to the method specified in ASTM D638 at 23° C. by using a dumbbell-shaped test piece. The tensile strength is preferably 90 MPa or more when the polyamide component is nylon 6 or 66 and 50 MPa or more when it is nylon 11 or 12.

(5) Bending Modulus

The bending modulus is determined according to the method specified in ASTM D790 at 23° C. The bending modulus is preferably 3.5 GPa or more when the polyamide component is nylon 6 or 66 and 2.0 GPa or more when it is nylon 11 or 12.

(6) Izod Impact Strength (with Notch)

The Izod impact strength was determined according to the method specified in ASTM D256 at 23° C. The Izod impact strength is preferably 45 J/m or more.

(7) Endurance Test

The endurance test was performed by using a vibration fatigue tester (type B70, manufactured by Toyo Seiki Seisakusho, Ltd) at 23° C. The test piece size was 3.2 mm in width, 12.7 mm in thickness, and 127 mm in length; the distance between spans was fixed at 35 mm; the number of cycles until the test piece was broken was determined while the test piece was vibrated at 30 cycle/sec under a load of 75 N when the polyamide component is nylon 6 or 66 and a load of 98N when it is nylon 11 or 12. The number of cycles until the test piece is broken is preferably $100\times10^3$ or more.

(8) Relative Abrasion and Coefficient of Dynamic Friction

The relative abrasion and the coefficient of dynamic friction were determined by using a Suzuki frictional abrasion tester (EFM-111-EN, manufactured by Toyo Baldwin) at 23° C. according to the method specified in JIS K7218. The test piece used was hollow cylinder in shape, while the counter material used was a S45C hollow cylinder; and the measurement was made under the conditions of a rate of 0.5 m/s and a sliding distance of 3.6 km, and under a load of 430 N when the polyamide component is nylon 6 or 66 and a load of 280 N when it is nylon 11 or 12. The relative abrasion and the coefficient of dynamic friction are both lower when the lubricity is better, and thus, the relative abrasion is preferably $1.0\times10^{-3}$ mm$^3$/(N-km) or less, and the coefficient of dynamic friction, 0.15 or less.

(9) Water Absorption

The water absorption was determined after immersion in water at 23° C. for 48 hours, by using a test piece similar in shape to that used in tensile strength measurement. The water absorption is preferably 1.5% or less when the polyamide component is nylon 6 or 66 and 0.5% or less when it is nylon 11 or 12.

(10) Dimensional Change after Water Absorption

The dimensional change of a test piece in the flow direction was determined after water absorption in water 23° C. for 48 hours, by using a test piece similar in shape to that used in tensile strength measurement. The dimensional change is preferably 0.2% or less when the polyamide component is nylon 6 or 66 and 0.1% or less when it is nylon 11 or 12.

(11) Epoxy Equivalence

The epoxy equivalence was determined according to the method specified in JIS K 7236.

(12) Viscosity

The viscosity was determined according to the method specified in JIS K 7233 at 25° C.

Example 1

100 parts by mass of a polyamide resin (A-1) and 0.5 part by mass of an epoxy compound (B-1) were melted and kneaded, and extruded by a twin screw extruder (TEM37-BS, manufactured by Toshiba Machine, Co. Ltd) at a resin temperature of 270° C. and pelletized. Then, the pellets obtained were dried and injection-molded in an injection molding machine (IS100E-3A, manufactured by Toshiba Machine, Co. Ltd) at a cylinder temperature of 270° C. and a mold temperature of 80° C., into various tests pieces for the tests above. Results are summarized in Table 1.

Examples 2 to 3 and Comparative Examples 1 to 6

Test pieces were prepared and used respectively in the tests of physical properties above in a similar manner to Example 1, except that the components in the composition shown in Table 1 were used. However, as there was gelation of the resin during melting and kneading in Comparative Examples 3 and 6, pelletization could not be made. Thus, the physical properties of the test pieces were not examined. The polyamide resin A-1 was used as it was in various tests in Comparative Example 4.

Example 4 and Comparative Examples 7 to 8

Test pieces were prepared and used respectively in the tests of physical properties above in a similar manner to Example 1, except that the components in the composition shown in Table 2 were used and the resin temperature during processing in the twin screw extruder was changed to 290° C. and the cylinder temperature during injection molding to 290° C. The polyamide resin A-4 was used as it was in various tests in Comparative Example 7.

Examples 5 to 7 and Comparative Examples 9 to 11

Test pieces were prepared and used respectively in the tests of physical properties above in a similar manner to Example 1, except that the components in the composition shown in Table 2 were used and the resin temperature during processing in the twin screw extruder was changed to 220° C. and the cylinder temperature during injection molding to 220° C. The polyamide resin A-5 was used as it was in various tests in Comparative Example 9. The polyamide resin A-V was used as it was in various tests in Comparative Example 11.

TABLE 1

|  |  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
| Polyamide resin | A-1 | 100 |  |  | 100 |  | 100 | 100 |  | 100 |
|  | A-2 |  | 80 |  |  | 80 |  |  |  |  |
|  | A-3 |  |  | 100 |  |  |  |  |  |  |
|  | P-1 |  | 20 |  |  | 20 |  |  |  |  |
|  | P-2 |  |  |  |  |  |  |  | 100 |  |
| Epoxy compound | B-1 | 0.2 |  | 3 |  |  | 5 |  | 0.5 |  |
|  | B-2 |  | 0.5 |  |  |  |  |  |  |  |
|  | B-3 |  |  |  | 0.5 |  |  |  |  |  |
|  | B-4 |  |  |  |  | 0.5 |  |  |  |  |
|  | B-5 |  |  |  |  |  |  |  |  | 0.5 |
| Tensile strength | MPa | 94 | 100 | 90 | 90 | 85 | — | 90 | 75 | — |
| Bending modulus | GPa | 4.1 | 4.8 | 4.0 | 3.9 | 4.6 | — | 3.6 | 2.7 | — |
| Izod impact strength | J/m | 50 | 60 | 75 | 40 | 25 | — | 30 | 30 | — |
| Specific abrasion amount | $10^{-3} \cdot mm^3/N \cdot km$ | 0.6 | 0.6 | 0.6 | 0.7 | 0.8 | — | 0.9 | 1.6 | — |
| Coefficient of dynamic friction | — | 0.13 | 0.13 | 0.14 | 0.15 | 0.16 | — | 0.15 | 0.2 | — |
| Durability | ×10³ cycle | 100 | 110 | 130 | 45 | 10 | — | 15 | 2 | — |
| Water absorption | % | 1.3 | 1.1 | 1.0 | 1.3 | 1.1 | — | 1.3 | 2.2 | — |
| Dimensional change by water absorption | % | 0.1 | 0.1 | 0.08 | 0.1 | 0.1 | — | 0.1 | 0.5 | — |

TABLE 2

|  |  | Example 4 | Comparative Example 7 | Comparative Example 8 | Example 5 | Example 6 | Comparative Example 9 | Comparative Example 10 | Example 7 | Comparative Example 11 |
|---|---|---|---|---|---|---|---|---|---|---|
| Polyamide resin | A-4 | 100 | 100 |  |  |  |  |  |  |  |
|  | A-5 |  |  |  | 100 |  | 100 |  |  |  |
|  | A-6 |  |  |  |  | 100 |  |  |  |  |
|  | A-7 |  |  |  |  |  |  |  | 100 | 100 |
|  | P-3 |  |  | 100 |  |  |  |  |  |  |
|  | P-4 |  |  |  |  |  |  | 100 |  |  |
| Epoxy compound | B-1 | 0.2 |  | 0.2 | 0.5 | 0.5 |  | 0.5 | 0.5 |  |
| Tensile strength | MPa | 91 | 86 | 82 | 56 | 53 | 51 | 44 | 54 | 51 |

TABLE 2-continued

|  |  | Example 4 | Comparative Example 7 | Comparative Example 8 | Example 5 | Example 6 | Comparative Example 9 | Comparative Example 10 | Example 7 | Comparative Example 11 |
|---|---|---|---|---|---|---|---|---|---|---|
| Bending modulus | GPa | 4.0 | 3.8 | 3.0 | 2.7 | 2.6 | 2.5 | 1.7 | 2.4 | 2.1 |
| Izod impact strength | J/m | 60 | 40 | 70 | 110 | 100 | 45 | 120 | 120 | 50 |
| Specific abrasion amount | $10^{-3} \cdot mm^3/N \cdot km$ | 0.6 | 0.6 | 1.4 | 0.8 | 0.8 | 0.8 | 2.0 | 0.8 | 0.9 |
| Coefficient of dynamic friction | — | 0.13 | 0.13 | 0.2 | 0.14 | 0.15 | 0.15 | 0.24 | 0.15 | 0.16 |
| Durability | $\times 10^3$ cycle | 100 | 20 | 3 | 110 | 100 | 20 | 1 | 120 | 30 |
| Water absorption | % | 1.3 | 1.3 | 1.8 | 0.3 | 0.3 | 0.3 | 0.7 | 0.4 | 0.4 |
| Dimensional change by water absorption | % | 0.1 | 0.1 | 0.4 | 0.05 | 0.05 | 0.05 | 0.3 | 0.07 | 0.07 |

As obvious from the results shown in Tables 1 and 2, in Examples 1 to 6, wherein an aliphatic epoxy compound having three glycidyl groups in the molecule was used, there was observed improvement in tensile strength and bending modulus as well as Izod impact strength, durability and lubricity. When an aliphatic epoxy compound containing two glycidyl groups in the molecule was used as in Comparative Example 1, durability was poor; and, even if the epoxy compound has three glycidyl groups in the molecule hut if it is not an aliphatic compound as in Comparative Example 2, tensile strength, Izod impact strength, and durability were poor. As there was gelation observed during melting and kneading, pelletization could not be made in Comparative Example 3 wherein the blending amount of the aliphatic epoxy compound having three glycidyl groups in the molecule is beyond the range of the present invention, and also in Comparative Example 6 wherein an aliphatic epoxy compound containing four glycidyl groups in the molecule was used. In Comparative Examples 4, 7, 9 and 11 wherein no aliphatic epoxy compound having three glycidyl groups in the molecule was used, all test items were poor, except for water absorption, compared to those of Examples 1, 4, 5 and 7. In Comparative Example 5, 8 and 10 wherein a polyamide resin containing no silicate layer was used, Izod impact strength was improved, but strength, elastic modulus and durability were not improved. There is also a problem of high water absorption.

INDUSTRIAL APPLICABILITY

The polyamide resin composition according to the present invention, which is superior in mechanical properties, durability, lubricity, and water absorption resistance, can be used in various applications, including various gears, bearings, bearing parts, brakes, clutch components, sealing parts, piston rings, parts for mechanical transmission mechanism (gear, friction wheel, cam, etc.), parts for clock mechanical, building materials, sporting products, and the like. These products can be produced by a known method of molding resin compositions. A favorable production method is, for example, injection molding.

The invention claimed is:

1. A polyamide resin composition, comprising 0.1 to 4 parts by mass of an aliphatic epoxy compound (B) having three glycidyl groups in the molecule and an epoxy equivalence of 137 to 180 g/eq, formulated to 100 parts by mass of a polyamide resin (A) with silicate layers of swellable lamellar silicate dispersed therein.

2. The polyamide resin composition according to claim 1, wherein the aliphatic epoxy compound (B) has trimethylolpropane and/or glycerol as a skeleton.

3. The polyamide resin composition according to claim 1, wherein viscosity of the aliphatic epoxy compound (B) at 25° C. is 1 to 1,000 mPa-s.

* * * * *